(12) United States Patent
Kim

(10) Patent No.: US 6,947,603 B2
(45) Date of Patent: Sep. 20, 2005

(54) METHOD AND APPARATUS FOR HYBRID-TYPE HIGH SPEED MOTION ESTIMATION

(75) Inventor: Sung-joo Kim, Seoul (KR)

(73) Assignee: Samsung Electronic., Ltd., Kyongki-do (KR)

( * ) Notice: Subject to any disclaimer, the term of this patent is extended or adjusted under 35 U.S.C. 154(b) by 631 days.

(21) Appl. No.: 09/854,934

(22) Filed: May 15, 2001

(65) Prior Publication Data

US 2002/0041699 A1 Apr. 11, 2002

(30) Foreign Application Priority Data

Oct. 11, 2000 (KR) ......................................... 2000-59732

(51) Int. Cl.[7] .............................. G06K 9/46; H04N 9/64; H04N 7/12
(52) U.S. Cl. ....................... 382/236; 382/107; 348/699; 375/240.16
(58) Field of Search .................................. 382/100, 104, 382/106–107, 154, 199, 173, 232, 236, 238, 240, 250, 270, 278; 348/400.1, 402.1, 416.1, 699, 413, 416, 421; 375/240.16, 240.17, 240.2

(56) References Cited

U.S. PATENT DOCUMENTS

| | | | | |
|---|---|---|---|---|
| 5,471,252 A | * | 11/1995 | Iu ................................ 348/699 |
| 5,537,155 A | * | 7/1996 | O'Connell et al. .......... 348/699 |
| 5,973,742 A | * | 10/1999 | Gardyne et al. ........ 375/240.15 |
| 6,058,212 A | * | 5/2000 | Yokoyama .................... 382/236 |
| 6,122,320 A | * | 9/2000 | Bellifemine et al. ......... 375/240 |
| 6,449,312 B1 | * | 9/2002 | Zhang et al. ........... 375/240.16 |
| 6,549,575 B1 | * | 4/2003 | Butter et al. ............ 375/240.16 |
| 6,584,155 B2 | * | 6/2003 | Takeda et al. .......... 375/240.16 |
| 6,671,319 B1 | * | 12/2003 | Chang et al. ........... 375/240.16 |

FOREIGN PATENT DOCUMENTS

JP  10-33662  12/1998

OTHER PUBLICATIONS

Chok–Kwon Cheung, et al., "Hybrid Search Algorithm for Block Motion Estimation", Proceedings of the 1998 II Symposium on Circuits and Systems, May 3,–Jun. 3, 1998, pp. 297–300, vol. 4, XP010289443.

(Continued)

*Primary Examiner*—Kanjibhai Patel
(74) *Attorney, Agent, or Firm*—Sughrue Mion, PLLC

(57) ABSTRACT

A method for motion estimation combining a one-pixel greedy search algorithm (OPGS) and a hierarchical search block matching algorithm (HSBMA), and an apparatus therefor are provided. The method includes the steps of (a) inputting a frame in units of macro blocks and a search area and estimating candidate motion vectors for a macro block desired to be estimated; and if an error of the candidate motion vectors estimated in step (a) is in a threshold range, estimating motion in a search area which is smaller by a predetermined amount than the previous search area, centered on the estimated location, and otherwise, estimating motion in the whole search area.

10 Claims, 4 Drawing Sheets

OTHER PUBLICATIONS

Choon–Hoon Lee, et al., "A New Block–Matching Algorithm Based on an Adaptive Search Area Adjustment Using Spatio–Temporal Correlation", 1999 Digest of Technical Papers: International Conference on Consumer Electronics, Jun. 22–24, 1999, pp. 362–363, vol. 18, XP010346596.

Ismaeil Ismaeil, et al., "Efficient Motion Estimation Using Spatial and Temporal Motion Vector Prediction", Proceedings: 1999 International Conference on Image Processing, Oct. 24–28, 1999, pp. 70–74, XP010369195.

Chok–Kwan Cheung, et al., "A Hybrid Adaptive Search Algorithm for Fast Block Motion Estimation", Aug. 1996, pp. 365–368, XP010240988.

Chok–Kwan Cheung, et al., "Hybrid Search Algorithm for Block Motion Estimation", May 31, 1998, pp. 297–300, XP010289443.

Choon–Hoon Lee, et al., "A New Block–Matching Algorithm Based on an Adaptive Search Area Adjustment Using Spatio–Temporal Correlation", Jun. 22, 1999, pp. 362–363, XP010346596.

Ismaeil et al., "Efficient Motion Estimation Using Spatial and Temporal Motion Vector Production", Oct. 24, 1999, pp. 70–74, XP010369195.

H. Y. Chung, et al., "Adaptive Search Center Non–Linear Three Step Search", Oct. 4, 1998, pp. 191–194, XP010308584.

Jae–Young Kim, et al., "An Efficient Hybrid Search Algorithm for Fast Block Matching in Video Coding", Sep. 15, 1999, pp. 112–115, XP000936531.

* cited by examiner (a)          (b)

METHOD AND APPARATUS FOR HYBRID-TYPE HIGH SPEED MOTION ESTIMATION

BACKGROUND OF THE INVENTION

1. Field of the Invention

The present invention relates to a method and apparatus for hybrid-type high speed motion estimation for application to a moving picture encoding apparatus, and more particularly, to a method and apparatus for motion estimation combining a one-pixel greedy search (OPGS) algorithm and a hierarchical search block matching algorithm (HSBMA).

2. Description of the Related Art

In general, international video standards, such as H.261, H.263, Moving Picture Experts Group (MPEG)-1, MPEG-2, and MPEG-4, have been adopted for video services, entertainment, digital broadcasting, and portable video terminals. A video encoder for generating a bit stream according to the international video standards compresses a video signal using compression algorithms, such as discrete cosine transform (DCT), quantization, and variable length coding, and a motion estimation algorithm.

Existing motion estimation algorithms include a full-search block matching algorithm (FSBMA) and a fast search algorithm (FSA). The FSBMA first obtains differences one by one between all possible locations within a search area in the previous frame and corresponding locations in the current frame, and then finds a location having the minimum error. However, though the FSBMA is the simplest and idealistically accurate, the FSBMA requires a huge amount of calculation and therefore is not appropriate for real-time encoding.

Meanwhile, compared to the FSBMA, the FSA greatly reduces the amount of calculation at the cost of less accuracy, and is appropriate for real-time video encoders (for example, video telephones, IMT-2000 terminals, video conference systems, etc.), in which video quality is relatively less important. Examples of the FSA include a hierarchical search block matching algorithm (HSBMA), a three-step search (TSS) algorithm, a 2D logarithmic search algorithm (LSBA), and a one-pixel greedy search (OPGS).

Here, the HSBMA has high accuracy and is relatively less affected by the amount of motion, but involves a large number of calculations, and requires a memory for storing low resolution frames. Also, the HSBMA requires a large number of calculations both for a long distance motion vector and a short distance motion vector without distinction.

The OPGS algorithm can find only an effective motion vector near a central point (or a starting point), may incorrectly converge on a local minimum point, may not obtain the correct result in a complex image having complex motion, and requires a large number of calculations to find a motion vector over a long distance.

Therefore, existing motion estimation algorithms cannot utilize the already calculated results and an opportunity to reduce unnecessary calculations, because each of these algorithms is applied uniformly to all blocks, regardless of the complexity of motion, and regardless of the characteristics of a subject block. Therefore, existing motion estimation algorithms can be properly implemented in hardware, such as a very large-scale integration (VLSI) chip, but it is not efficient to implement the algorithms in a software-dedicated encoder. Also, an inexpensive price, low voltage central processing unit (CPU) cannot be used to implement the algorithms in software due to the large number of calculations.

SUMMARY OF THE INVENTION

To solve the above problems, it is a first object of the present invention to provide a motion estimation method in which unnecessary calculations are minimized and accuracy is enhanced by performing hybrid-type motion estimation combining a one-pixel greedy search (OPGS) algorithm and a hierarchical search block matching algorithm (HSBMA).

It is a second object to provide a motion estimation apparatus to which a motion estimation method combining the OPGS algorithm and the HSBMA algorithm is applied.

To accomplish the first object of the present invention, there is provided an adaptive motion estimation method, the motion estimation method having the steps of (a) inputting a frame in units of macro blocks and a search area and estimating candidate motion vectors for a macro block desired to be estimated; and (b) if an error of the candidate motion vectors estimated in step (a) is in a threshold range, estimating motion in a restricted search area centered on the estimated location, and otherwise, estimating motion in the whole search area.

To accomplish the second object of the present invention, there is also provided an adaptive motion estimation apparatus, the motion estimation apparatus having a vector estimation unit for receiving video data, and estimating a motion vector matching a macro block desired to be estimated by selecting from among a zero motion vector, the previous motion vector, and the motion vectors of neighboring blocks as candidate motion vectors; an algorithm selecting unit for selecting a motion estimation algorithm by comparing an error of the candidate vector estimated in the candidate vector estimation unit with a preset threshold; and a motion estimation unit for estimating motion in a restricted search area, centered on the estimated location, if an error of the candidate motion vectors estimated in the algorithm selecting unit is in a threshold range, and otherwise, estimating motion in the whole search area.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Hereinafter, embodiments of the present invention will be described in detail with reference to the attached drawings.

The present invention is not restricted to the following embodiments, and many variations are possible within the spirit and scope of the present invention. The embodiments of the present invention are provided in order to more completely explain the present invention to anyone skilled in the art.

Figure 1:
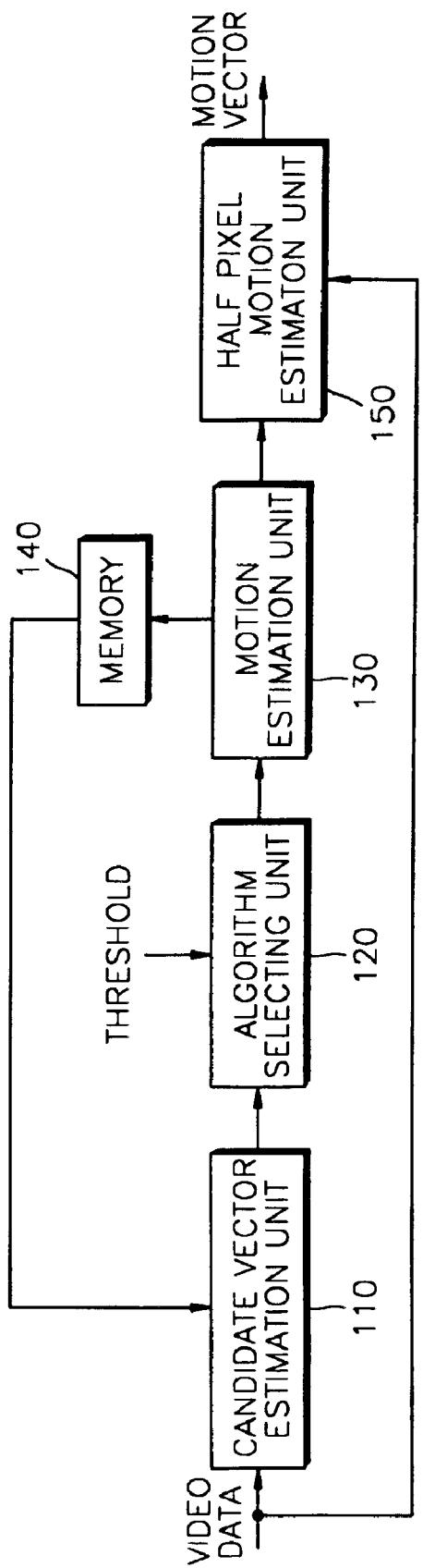
FIG. 1 is a block diagram of an apparatus for hybrid-type high speed motion estimation according to the present invention.

FIG. 1 is a block diagram of an apparatus for hybrid-type high speed motion estimation according to the present invention.

The apparatus of FIG. 1 has a candidate vector estimation unit 110, an algorithm selecting unit 120, a motion estimation unit 130, a memory 140, and a half pixel motion estimation unit 150.

Referring to FIG. 1, the candidate vector estimation unit 110 receives video data and estimates a candidate vector for a macro block to be estimated at present. At this time, as a candidate motion vector, the candidate vector estimation unit 110 selects the best matching motion vector among a zero motion vector, a previous motion vector, and the motion vectors of neighboring blocks.

The algorithm selecting unit 120 selects a motion estimation algorithm (the OPGS or the HSBMA), by comparing the sum of the absolute difference (SAD) between the candidate vector estimated by the candidate vector estimation unit 110 and a predetermined threshold.

The motion estimation unit 130 performs full pixel motion estimation of a macro block input by a motion algorithm (the OPGS or the HSBMA) selected by the algorithm selecting unit 120.

A memory 140 stores a full pixel motion estimated value estimated by the motion estimation unit 130 and applies the estimated value to the candidate vector estimation unit 110.

With video data input, the half pixel motion estimation unit 150 estimates the half pixel motion of a 16×16 macro block and 8×8 sub-block, referring to the location of the full pixel motion estimated value estimated by the motion estimation unit 130.

Figure 2:
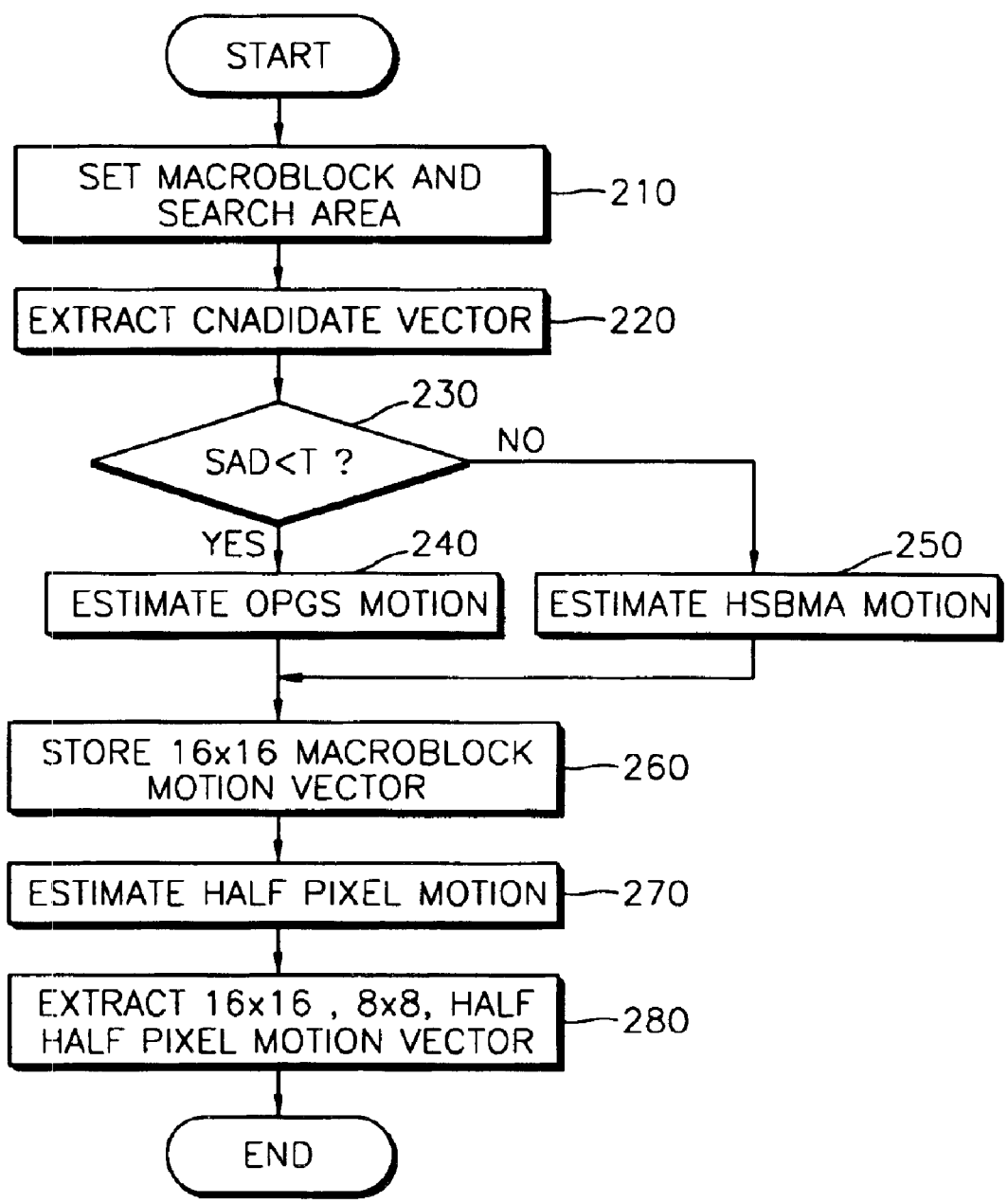
FIG. 2 is a flowchart of a method for hybrid-type high speed motion estimation according to the present invention.

FIG. 2 is a flowchart for a method for hybrid-type high speed motion estimation according to the present invention.

Referring to FIGS. 3 through 6, the flowchart of the method for high speed motion estimation shown in FIG. 2 will now be explained.

First, input video data (or a frame) is divided into macro blocks that are desired to be searched, and a search area of the previous or next frame for a macro block is set in step 210.

Figure 3:
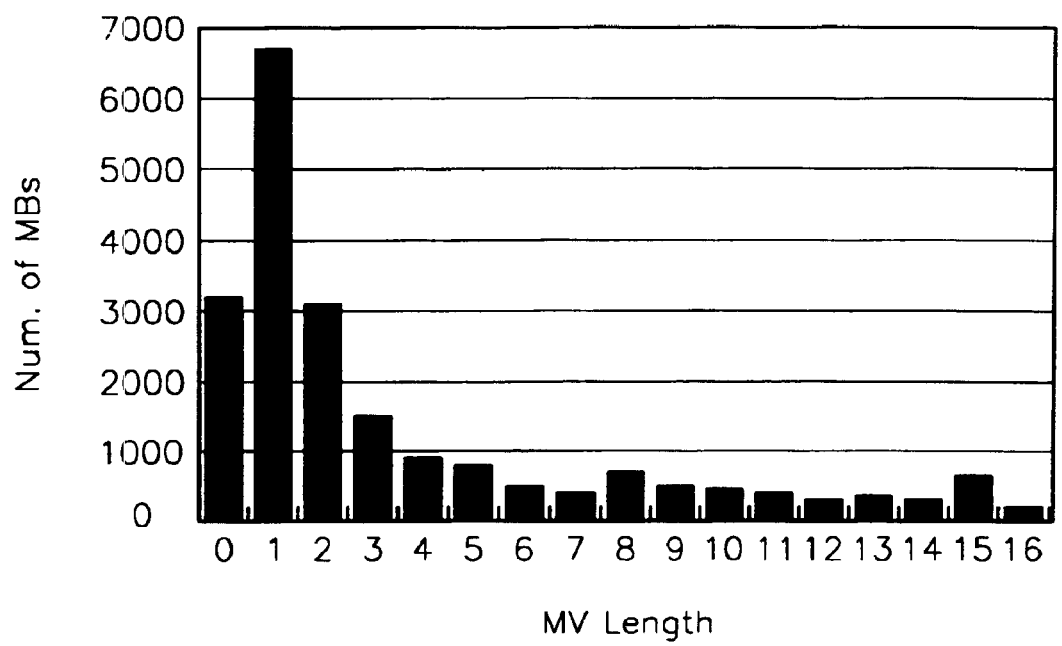
FIG. 3 is a graph showing the distribution of macro blocks by motion vector size obtained by performing a full-search block matching algorithm (FSBMA)

Then, a candidate vector for the macro block of which a motion vector is desired to be estimated is estimated in step 220. For example, as shown in FIG. 3, the macro block distribution by motion size, obtained by performing the FSBMA with video data, shows that a good many motion vectors have lengths between "0" and "1". Therefore, to obtain these motion vectors, a motion estimation algorithm, which can reduce calculations referring to the distribution degree, as shown in FIG. 3, is applied instead of applying only one motion estimation algorithm to all macro blocks.

Therefore, the best matching value among (1) a zero motion vector, (2) motion vectors of neighboring blocks, and (3) the previous motion vector, for example a vector value having the minimum SAD is set as a candidate motion vector.

Here, three candidate motion vectors are set as follows.

A first candidate motion vector (1) is set to a motion vector having a length of "0 " (zero motion vector).

Figure 4:
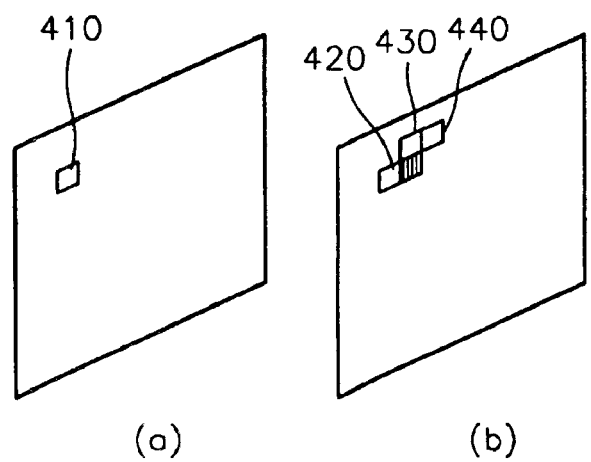
FIG. 4 is a conceptual diagram showing estimation of a candidate vector in the previous frame and next frame, according to FIG. 2.

A second candidate motion vector (2) is set to a median value of motion vectors of three macro blocks 420, 430, and 440, of which motion vectors have already been calculated, centered on the current macro block, as shown in (b) of FIG. 4. However, if the current frame is a bidirectional (B)-type, one among a forward motion vector, a backward motion vector, and a bidirectional motion vector in the neighboring macro blocks is selected. Therefore, if one of the three direction motion vectors is known, the remaining direction motion vectors can be estimated by scaling the motion vector that is already known. For example, if a forward motion vector is known, the forward motion vector is appropriately scaled according to the number of intervals of a reference frame, and by inverting the sign of the scaled motion vector, a backward motion vector is estimated. Likewise, a backward motion vector can be appropriately changed into a forward motion vector. Therefore, after obtaining a median by calculating the three types of motion vectors (forward, backward, and bidirectional) for each of the neighboring macro blocks 420, 430, and 440, the motion vector best matching the macro block desired to be estimated is set as the second candidate motion vector (2).

As shown in (a) of FIG. 4, if the current frame is a predictive (P)-type frame, a third candidate motion vector (3) is set to a motion vector 410 of a macro block at the same location in the current frame as the location in the previous P-type frame, or is set to a median of the motion vectors of the five macro blocks including the 4 neighboring macro blocks. At this time, if the current frame is a B-type frame, the motion vector of a macro block at the same location of the current frame as the previous or next P-type frame, which is used to estimate the motion vector of the current frame, is estimated by scaling. After scaling the four neighboring macro blocks, a median is set as the third candidate motion vector (3). At this time, if one directional component of a macro block is known, motion vectors of the remaining directions (forward, backward, and bidirectional) can be estimated through scaling and inverting the sign, as in the method used to estimate the second candidate motion vector.

Then, a motion estimation algorithm is selected by comparing the value best matching the search area among the candidate motion vectors (for example, using the minimum SAD), with the predetermined threshold (T), in step 230. Here, if moving pictures are encoded real time in a multitasking environment, a shortage of CPU processing power may occur. In this case, if a constant frame rate is desired, a target encoding time for each frame is calculated in advance. Therefore, a threshold (T) is adjusted by estimating an encoding time for each slice (a group of a series of macro blocks) for the current frame based on the target encoding time calculated in advance.

Figure 5:
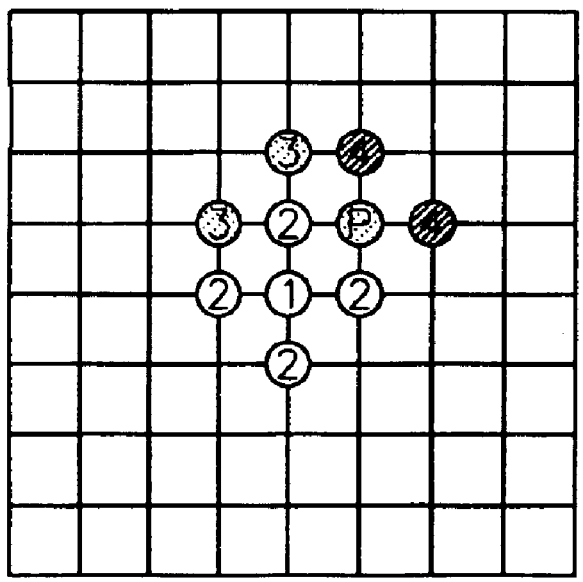
FIG. 5 is a conceptual diagram for a one-pixel greedy search (OPGS) algorithm according to FIG. 2.

Then, if the minimum SAD value corresponding to the value best matching the macro block to be estimated, among the candidate motion vectors, is within the range of the threshold (T), the OPGS algorithm is selected. At this time, according to the known OPGS algorithm, a motion vector is searched for in a more limited range of ½ or ¼ of the absolute value which a motion vector that is defined by "f code" can be, centered on the location corresponding to the estimated candidate motion vector, in step 240. At this time, the f code indicates a maximum search range and a minimum search range within which a motion vector can be. Referring to FIG. 5, ① is a starting point corresponding to an estimated location, like (a) and (b) of FIG. 4. Centered on the starting point (①), matching for each of four locations indicated by ② is performed, and then matching for each of four locations indicated by ③ or ④ is performed, and then matching is performed repeatedly until best matching neighboring values do not exist. In this way, a motion vector which is the best matching location corresponding to the result ($^{(P)}$) is finally converged.

Here, for H.263 and MPEG-4 standards, the OPGS usually performs 8×8 sub-block motion estimation (advanced prediction mode or 4MV mode) in a range within ±2 of the motion vector of a macro block. However, in the present invention, 16×16 macro block OPGS is performed and then OPGS for each 8×8 sub-block is performed in a range within ±2 of the motion vector. Also, an unrestricted motion vector in an extended area is estimated through repetitive padding as defined in the standards.

Figure 6:
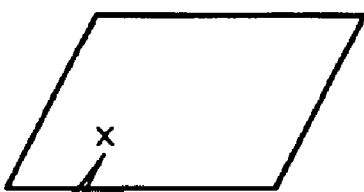
FIG. 6 is a conceptual diagram for a hierarchical search block matching algorithm (HSBMA) according to FIG. 2.
Figure 6:
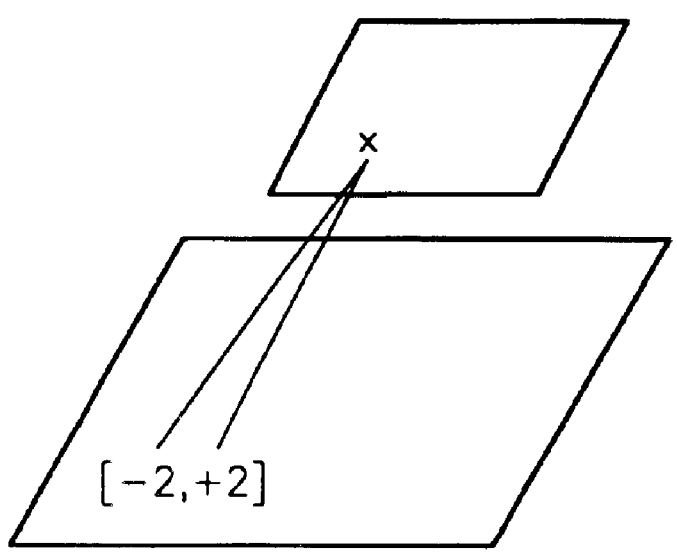

Then, if estimation fails because the best matching value among the candidate motion vectors, that is, SAD, is outside of the threshold, the HSBMA algorithm is performed. The HSBMA algorithm performs motion estimation for the entire search area indicated by the f code. Referring to FIG. 6, the embodiment will now be explained. From a search area formed of a low resolution or sub-sampled image (for example: [31 2,+2]), a motion vector is searched for in stage 1. Using the search result of stage 1, a precise motion vector is searched for in a restricted search area in a high resolution image or the original image in stage 2. This process is continuously repeated until the highest resolution (or the original image) is reached, and then the best matching block location is set to the motion vector.

Also, HSBMA uses a spiral search, and, if the matching degree is good enough when the motion vector which is calculated in each stage (stage 1, and stage 2) and compared to the preset threshold, the motion vector is selected as the final estimated value. Here, the threshold determines the range of allowable error, determines the accuracy and calculation amount of HSBMA, and is selected depending on an estimated encoding time.

Here, when a motion vector for a 8×8 sub-block of is estimated, HSBMA estimates the motion of each of four sub-blocks in stage 2, and estimates the motion of a macro block by adding the matching values of the four blocks. Also, when necessary, HSBMA estimates an unrestricted motion vector for an extended search area after repetitive padding.

Then, motion vectors, by pixel unit, estimated by the OPGS algorithm or the HSBMA algorithm are stored in units of 16×16 macro blocks, and a motion vector by half pixel is estimated on the basis of pixel unit motion estimation in steps 260 and 270.

Then, motion vectors of 16×16 macro block, 8×8 sub-block, and half pixel are extracted in step 280.

According to the present invention as described above, a motion vector is estimated, and then OPGS is performed centered on the estimated location, and if the estimation fails, the estimation is compensated by HSBMA to prevent errors due to the inaccurate estimation. By doing so, high accuracy can be maintained while the amount of calculation can be reduced. The present invention is particularly effective in a real time encoder.

What is claimed is:

1. An adaptive motion estimation method, the motion estimation method comprising the steps of:
   (a) inputting a frame in units of macro blocks and a search area, and estimating candidate motion vectors for a macro block desired to be estimated; and
   (b) if an error of the candidate motion vectors estimated in step (a) is in a threshold range, estimating motion in a restricted search area centered on the estimated location, and otherwise, estimating motion in the whole of said search area, wherein step (b) further comprises the sub-steps of:
   (b-1) if an error of the estimated candidate motion vector is within the threshold range, performing a one-pixel greedy search (OPGS) algorithm; and
   (b-2) otherwise, performing a hierarchical search block matching algorithm (HSBMA).

2. The motion estimation method of claim 1, wherein a zero motion vector, a median of motion vectors of neighboring macro blocks, and a value estimated from the previous or next frame are generated, and a candidate motion vector is obtained by selecting a value best matching the macro block desired to be estimated, among the three values.

3. The motion estimation method of claim 1, wherein the threshold in step (b) is adjusted by estimating an encoding time for the current frame at each slice unit corresponding to the macro block group, based on a target encoding time calculated in advance.

4. The motion estimation method of claim 1, wherein by using a spiral search in step (b-2), the HSBMA compares a motion vector matching degree with an allowable error range selected according to an estimated encoding time among preset thresholds at each search stage, and selects the compared value within said range as a motion vector.

5. An adaptive motion estimation apparatus, comprising:
   a vector estimation unit for receiving video data, and estimating a motion vector for a macro block desired to be estimated, by selecting from among a zero motion vector, the previous motion vector, and motion vectors of neighboring blocks, as a candidate motion vector;
   an algorithm selecting unit for selecting a motion estimation algorithm by comparing an error between the candidate vector and a preset threshold; and
   a motion estimation unit for estimating motion within a restricted search area, centered on an estimated location, if an error in the candidate motion vector is in a threshold range, and otherwise, estimating motion in a whole search area,
   wherein the motion estimation algorithm comprises at least one of a one-pixel greedy search algorithm and a hierarchical search block matching algorithm.

6. The motion estimation apparatus of claim 5, further comprising: a half pixel motion estimation unit for estimating half pixel motion, referring to the location of the estimated value estimated by the motion estimation unit.

7. An adaptive motion estimation processing method comprising:
   selecting a portion of received image data to be processed;
   determining respective correlations between the selected portion and each of a zero motion vector, a previous motion vector and a motion vector corresponding to neighbor blocks; and
   selecting one of a plurality of motion estimation algorithms based on the respective correlations,
   wherein the plurality of motion estimation algorithm comprise one or more of a one-pixel greedy search algorithm and a hierarchical search block matching algorithm.

8. An adaptive motion estimation processing method as claimed in claim 7, wherein a method for calculating the motion vector corresponding to neighbor blocks comprises determining a median value of motion vectors corresponding to one or more neighbor blocks of the received image data, wherein each of the neighbor blocks are positioned in a location within the image data other than a location of the selected portion.

9. A motion estimation processing device comprising:
- a first selection portion operable to select a portion of received image data to be processed;
- a determining portion operable to determine respective correlations between the selected portion and each of a zero motion vector, a previous motion vector and motion vectors corresponding to neighbor blocks; and
- a second selection portion operable to select one of a plurality of motion estimation algorithms based on the respective correlations.

wherein the plurality of motion estimation algorithm comprise one or more of a one-pixel greedy search algorithm and a hierarchical search block matching algorithm.

10. A motion estimation processing device as claimed in claim 9, further comprising a computation unit operable to determine a median value of motion vectors corresponding to one or more neighbor blocks of the received image data, wherein each of the neighbor blocks are positioned in a location within the image data other than a location of the selected portion.

* * * * *